(12) United States Patent
Catt et al.

(10) Patent No.: US 9,574,365 B2
(45) Date of Patent: Feb. 21, 2017

(54) CLAMPS FOR REPAIRING POSTS AND METHODS AND/OR ARRANGEMENTS FOR REPAIRING SUCH POSTS WITH SAID CLAMPS

(75) Inventors: Nigel Catt, Adelaide (AU); Brian O'Malley, Adelaide (AU)

(73) Assignee: OCVITTI PTY LTD (AU)

(*) Notice: Subject to any disclaimer, the term of this patent is extended or adjusted under 35 U.S.C. 154(b) by 704 days.

(21) Appl. No.: 14/006,524

(22) PCT Filed: Mar. 29, 2012

(86) PCT No.: PCT/AU2012/000325
§ 371 (c)(1),
(2), (4) Date: Jan. 26, 2016

(87) PCT Pub. No.: WO2012/129607
PCT Pub. Date: Oct. 4, 2012

(65) Prior Publication Data
US 2016/0130833 A1    May 12, 2016

(30) Foreign Application Priority Data

Mar. 30, 2011 (AU) ................. 2011901174

(51) Int. Cl.
*F16M 13/00* (2006.01)
*E04H 12/22* (2006.01)
(Continued)

(52) U.S. Cl.
CPC ........... *E04H 12/2292* (2013.01); *A01G 17/14* (2013.01); *E04H 17/22* (2013.01)

(58) Field of Classification Search
CPC .. E04H 12/2292; E04H 17/22; E04H 12/2215; A01G 17/14; A01G 17/16; A01G 17/06; E02D 5/60; E02D 5/64; E02D 31/00; E02D 31/002; E02D 5/223; E02D 3/226; E02D 5/80; E04G 23/02; E04G 23/0203; E04G 23/0218; E04G 23/0225
(Continued)

(56) References Cited

U.S. PATENT DOCUMENTS 405,658 A * 6/1889 Campany ............ E04H 12/2292
            52/170
761,721 A * 6/1904 Stanley ............... E04H 12/2292
            405/216
(Continued)

FOREIGN PATENT DOCUMENTS

WO    2011011834 A1    2/2011

*Primary Examiner* — Christopher E Garft
(74) *Attorney, Agent, or Firm* — Renner Kenner Greive Bobak Taylor & Weber

(57) ABSTRACT

A clamp arrangement includes a pair of brackets adapted to be clamped on opposing sides of the wooden post to encapsulate a fractured portion, each bracket is made from an integral sheet of metal cut and pressed to define a longitudinal hemispherical chamber and a pair of longitudinal flanges extended out from each, the longitudinal hemispherical chamber having an upper end wherein a lip is supported in the lateral extension by a multitude of pressed out ribs such that when the clamp arrangement is required to be driven into the ground about the wooden post, the lip provides a support location for an impact tool to drive the clamp arrangement into the ground.

11 Claims, 5 Drawing Sheets

(51) Int. Cl.
*A01G 17/14* (2006.01)
*E04H 17/22* (2006.01)

(58) Field of Classification Search
USPC ..... 248/545, 530, 532, 156; 52/514; 47/32.4
See application file for complete search history.

(56) References Cited

U.S. PATENT DOCUMENTS

| | | | | |
|---|---|---|---|---|
| 907,817 | A | * | 12/1908 | Knoerzer ............ E04H 12/2215 256/1 |
| 985,605 | A | * | 2/1911 | Konopinski ........ E04H 12/2292 52/835 |
| 3,679,250 | A | * | 7/1972 | Marsden .................... B04C 5/16 403/313 |
| 6,019,549 | A | * | 2/2000 | Blair ....................... E01D 19/02 24/460 |
| 6,347,911 | B1 | * | 2/2002 | Blair ....................... E01D 19/02 24/462 |
| 2006/0180719 | A1 | * | 8/2006 | Cooper ............... E04H 12/2215 248/156 |

* cited by examiner

CLAMPS FOR REPAIRING POSTS AND METHODS AND/OR ARRANGEMENTS FOR REPAIRING SUCH POSTS WITH SAID CLAMPS

CROSS REFERENCE TO RELATED APPLICATIONS

The present application is a National Phase filing of PCT/AU2012/000325, filed Mar. 29, 2012, published as WO2012/129607 on Oct. 4, 2012, and claiming priority to Australian application 2011901174, filed Mar. 30, 2011.

TECHNOLOGICAL FIELD

This invention relates to a clamping arrangement for supporting a fractured portion of a wooden post and more particularly a clamping arrangement that would for the most part not require the damaged post to be dug out of the ground or if the case may have it for wires and other interlocking fencing structures connected or running through the posts to be removed before the repair can be completed.

BACKGROUND ART

Wooden posts, the kinds one often equates with those that could be seen across vineyards and orchards play a significant part in maintaining the overall support and integrity of the interconnecting wire and/or trellis that is supporting the plantations thereon.

In many instances when the post becomes damaged this wiring needs to be disengaged and removed, the post replaced or repaired to then have the troublesome task of again re-tensioning the wire and/or trellis along a particular column or row.

Quite often the wooden post is damaged towards the base of the post and even in some instances underground.

It would be particularly advantageous if it was possible to almost insitu repair the damaged post rather than having to dig the post out to then replace with an undamaged post, and most importantly by being able to repair the post insitu not have to disengage the interconnecting wire and/or trellis.

As disclosed in the U.S. Pat. No. 985,605 for well over 100 years people have relied upon clamping arrangements to repair broken posts which for the most part include two brackets configured to come together on opposing sides such that their general shape will encapsulate the post and provide the necessary support.

As also shown in U.S. Pat. No. 985,605 these kinds of brackets can be positioned around the base of the wooden post both immediately above and below the ground.

In order to drive the brackets into the ground rather than having to dig out the post, brackets have been hitherto designed that include sharpened or arrowed ends on the bracket and so forth to which when impact is made on the top of the bracket this drives the fastened brackets into the ground.

However, in order to adequately absorb this impact to drive the brackets into the ground, the brackets themselves are often quite thick and made of reinforced material with various sections of the brackets forged or cast together due to their required thickness in being able to provide a location in which an impact tool can engage the bracket in order to drive into the ground and also allowing the bracket to be of a requisite strength so that it doesn't collapse, break or shatter upon such impact.

As would be expected therefore these kinds of clamping arrangements which require the ability to be impacted so as to be driven into the ground are expensive to manufacture, by their very nature heavy and cumbersome to handle, and require significant storage and transportation considerations.

As the person skilled in the art would realise in any field of technology costs and efficiencies are paramount. The repair of damaged posts in vineyards and orchards often involves the contractors or in-house maintenance personnel being required to repair many posts at a certain time of the year when growing and harvesting of the plant would make that time available.

Therefore, if repairing of damaged posts involved a repairer taking out into the field heavy, expensive and difficult to arrange brackets this will make their task all that more inefficient and uneconomical.

Still further if the clamping arrangement requires the brackets to be of increased thickness in order to provide a location and structural integrity to absorb the applied impact forces as the brackets are driven into the ground, it also then becomes a much more difficult task to first fasten the brackets together about the post and also given the thickness and weight of the brackets are significant greater effort and tooling is going to be required in order to drive such a clamp arrangement into the ground.

Accordingly, it is an object of this invention to provide a clamp arrangement for supporting a fractured portion of a wooden post wherein a portion of the clamp arrangement is required to be driven into the ground so that the post can be repaired in position with all the relevant wires and/or trellis attached so that no disturbance to the plantation supported thereon needs to be taken into consideration.

SUMMARY OF THE INVENTION

Accordingly, in one form of the invention there is provided a clamp arrangement for supporting a fractured portion of a wooden post wherein at least part of the clamp arrangement needs to be driven into the ground about the wooden post, said arrangement including:

a pair of brackets adapted to be clamped on opposing sides of the wooden post to encapsulate said fractured portion;

each bracket made from an integral sheet of metal cut and pressed to define a longitudinal hemispherical chamber of compatible diameter dimensions to the wooden post;

a pair of longitudinal flanges extended out from each side at a circumferential circumference edge at an open end of the longitudinal hemispherical chamber, wherein each flange includes a plurality of holes so that when each bracket is brought together about the post the plurality of holes on the respective longitudinal flanges line up so that a fastening arrangement can pass there through the holes to clamp each bracket together about the post;

said longitudinal hemispherical chamber having an upper end, said upper end characterised in having a laterally extended lip, wherein the lip is supported in the lateral extension by a multitude of pressed out ribs emanating from the side of the longitudinal hemispherical chamber such that when the clamp arrangement is required to be driven into the ground about the wooden post, the lip provides a support location for an impact tool to drive the clamp arrangement into the ground.

An advantage of such an arrangement is that by having an integral sheet of metal that can be cut and pressed into shape to inherently provide a support for a lip at the upper edge through the pressed out ribs, means that rather than being made of thick, expensive, hard to manufacture and produce brackets that would be difficult to carry and position about the post, what has been provided for herewith is a durable light weight sheet of metal that is able to encapsulate the damaged or fractured portion of the post and is driveable into the ground by the introduction of a supported lip at the upper edge of the bracket to which an impact tool can engage.

Advantageously rather than simply having a lateral lip which upon impact would just collapse down if it was folded back from a single sheet of metal, by the introduction of the pressed out ribs to provide support for the lip the metal sheet of the bracket can maintain its integrity and be driven into the ground.

As expected given the bracket is simply an integral sheet of metal it can be conveniently mass produced by cutting, stamping and/or pressing. There would be no requirement of having to forge or cast heavy set metal of considerable thickness because through the use of the unique introduction of the pressed out rib to support the lip at the upper edge, the brackets themselves are inherently now configured with a feature that will absorb the impact without affecting the remaining structure and integrity of the bracket.

As the brackets are only an integral sheet of metal, they can be easily stacked one upon the other, they will be easily transportable and easily brought out into the field where repair on potentially scores and scores of posts may need to take place over a set period of time.

In preference, the pressed out ribs emanate from an internal side at the upper end of the longitudinal hemispherical chamber.

In preference the pressed out ribs on the internal side at the upper end of the longitudinal hemispherical chamber provide a series of levelled out peaks and intermittent troughs where the levelled out peaks are configured to abut up against the external surface of the post.

In preference, the intermittent troughs between the levelled out peaks of the pressed out ribs provide a passage for air flow down through the bracket when fastened to the post.

An advantage of such an arrangement is that while the pressed ribs at the upper end of the longitudinal hemispherical chamber provide support for the laterally extended lip they also provide a point of contact between the post and the clamp and rather than being a singled straight edge, if there is any vibration of the post impact is being made against these levelled out peaks of the pressed ribs. Over time this is advantageous in that if the lateral lip was simply straight flat extension with a continuous edge abutting up against the wooden post, stresses through time due to vibration of the posts say for example during harvesting when the plantations are being shaken or even in windy conditions and so forth, over time can lead to potentially a reduction in the structural integrity of the post.

Advantageously also the introduction of the troughs between these levelled out peaks of the pressed out ribs that support the lateral extended lip provide an opportunity for air and so forth to pass down into the bracket.

As is to be expected when a clamping arrangement clamps itself about a particular post, encapsulation is often such that there is no further interaction between that part of the wooden post covered by the clamp and the outside environment.

This means that the wooden post itself has different levels of deterioration as one part is inside the clamp is exposed to a different environmental condition to those that are unexposed by the clamp arrangement.

Potentially over time wood along the post therefore will be of different integrity between two parts of the wooden post this can also lead to locations of weakness between the two regions that could lead to fracturing.

In preference, the longitudinal hemispherical chamber includes a configuration of pressed out interconnected diamond shaped protrusions that emboss out over the external surface of the longitudinal hemispherical chamber.

An advantage of such an arrangement is that the introduction of these diamond shapes embossed pressings provides additional integral support for each bracket.

As is to be expected it is important that as the metal brackets are driven into the ground structural integrity across the entire length is important so that the actual brackets themselves remain tightly clamped in place about the wooden post and don't bend or become fractured or buckle away from the wooden post in any way.

Advantageously the introduction of the diamond configured pressed out emboss along the length of the hemispherical chamber introduces further inherent strength to the bracket that would otherwise be expected.

In preference, the configuration of pressed out interconnected diamond shaped protrusions that emboss out over the external surface of the longitudinal hemispherical chamber have joined edges that are pressed out along the edge where the longitudinal flanges extend out from each side of the circumpheral edge at the open end of the longitudinal hemispherical chamber.

Advantageously again inherent pressings into the metal bracket provide additional support and structural integrity.

In preference, along a contact fold where the longitudinal flanges extend out from each side of the circumpheral edge at the open end of the longitudinal hemispherical chamber a multiplicity of pressed tabs are embossed out.

In preference, the holes along each of the longitudinal flanges include a raised rim or collar.

In preference, the longitudinal hemispherical chamber includes additional holes on its surface to wherein nails and so forth can be passed there through to provide additional fixation of the bracket to the wooden post.

In preference, the impact tool is a hammer and/or a motor driveable ramming device including a jack hammer.

In preference, an outside edge of each longitudinal flange includes a rounded shoulder.

An advantage of such an arrangement is that the additional slight folding of the peripheral edge of the side flanges again introduces further degree of structural integrity by improving the rigidity and strength to the brackets when clamped into position and then subjected to the impact as the clamping arrangement is driven into the ground.

In preference, the clamp arrangement further includes an aperture to which wire and trellis connected to adjacent posts can be wrapped around and supported therefrom.

In preference, the longitudinal flange extending out from each side of the circumpheral edge at the open edge of the longitudinal hemispherical chamber at the ground engaging end is tapered.

An advantage of such an arrangement is that as the flanges are cut with an inclined or tapered configuration the overall base of the bracket provides more of a stake functionality to assist in driving the bracket into the ground as required.

In preference the integral sheet of metal is a single sheet of thickness between 1 mm to 3.2 mm.

In order to describe the invention now in greater detail preferred embodiment will be presented with the assistance of the following illustrations.

DETAIL DESCRIPTION OF THE DRAWINGS

Figure 5:
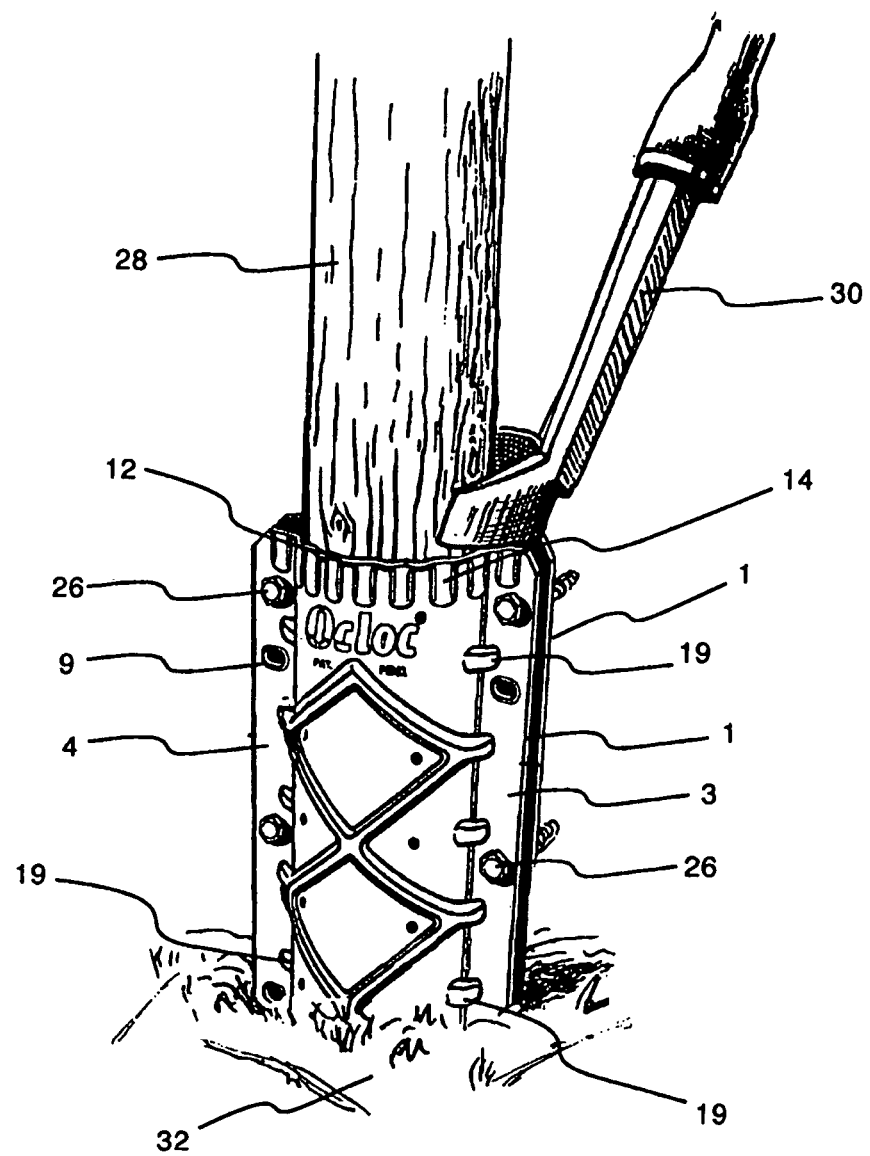
FIG. 5 is a general perspective view of the clamp arrangement being driven into the ground with an impact tool in a preferred embodiment of the invention.

Referring to the illustrations now in greater detail wherein a bracket shown generally as 1 is formed from a single integral sheet of metal that has been cut and pressed so as to provide for a central longitudinal hemispherical chamber 2 which provides a hollow opening 5 of which when two such brackets 1 are fastened together within the clamp arrangement as to be discussed more specifically in relation to FIG. 5 the dimensions would be such so as to encapsulate and comfortably fit about the post which is under repair.

The longitudinal hemispherical chamber 2 has two respective flanges 3 and 4 that extend out from folds 23 and 25 the longitudinal flanges 3 and 4 terminate with inclined or tapered edges 6 and 7 such that these inclined edges 6 and 7 of flanges 3 and 4 in combination with the bottom edge 8 of the main longitudinal hemispherical chamber 2 provide a configuration which upon impact to the bracket 1 allows penetration into the ground substrate.

The top of the longitudinal hemispherical chamber 2 includes lip 12 that extends laterally out. The lateral lip 12 is supported structurally by pressed out ribs 14 that follow the curve of the lip 12.

Figure 3:
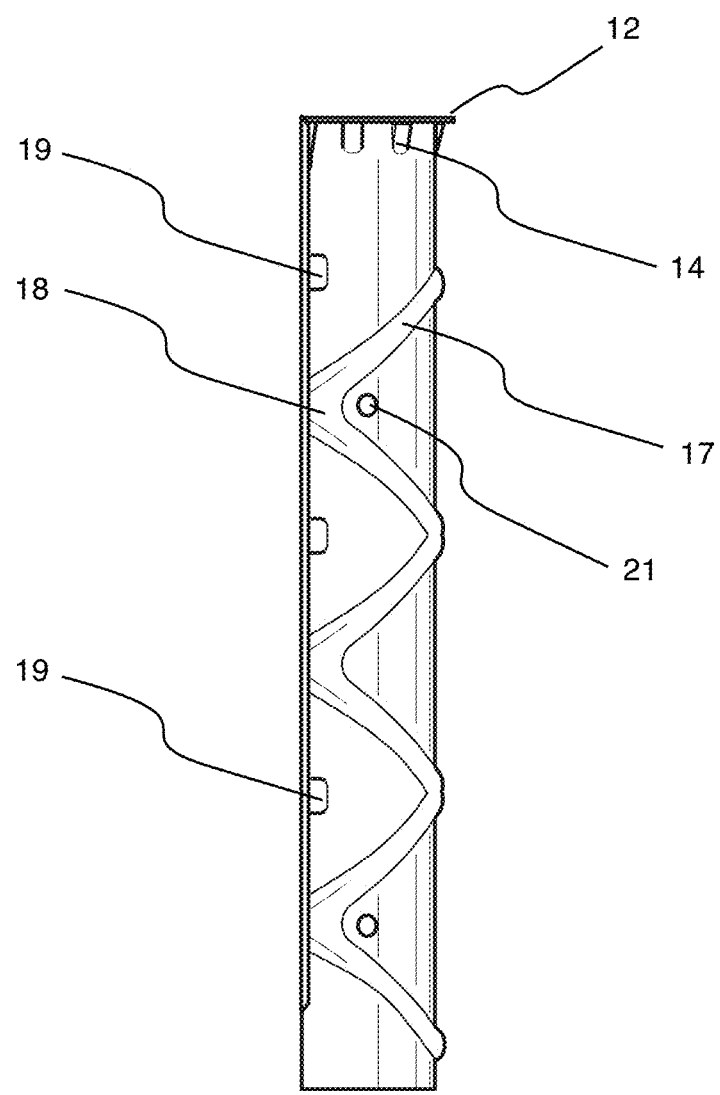
FIG. 3 is a side view of the bracket of the clamp arrangement shown in FIG. 1.

As best seen in FIG. 3 the pressed ribs have a tapered or incline configuration leaning forward in support of the lateral lip 12.

In the embodiment shown within the illustrations the flanges 3 and 4 also include pressed ribs 15 and 16 in order to support the corresponding lip extensions 27 and 29 to which again will be discussed in relation to FIG. 5 the impact tool responsible for driving the clamp arrangement into the ground can also engage the brackets at that location if required.

Figure 1:
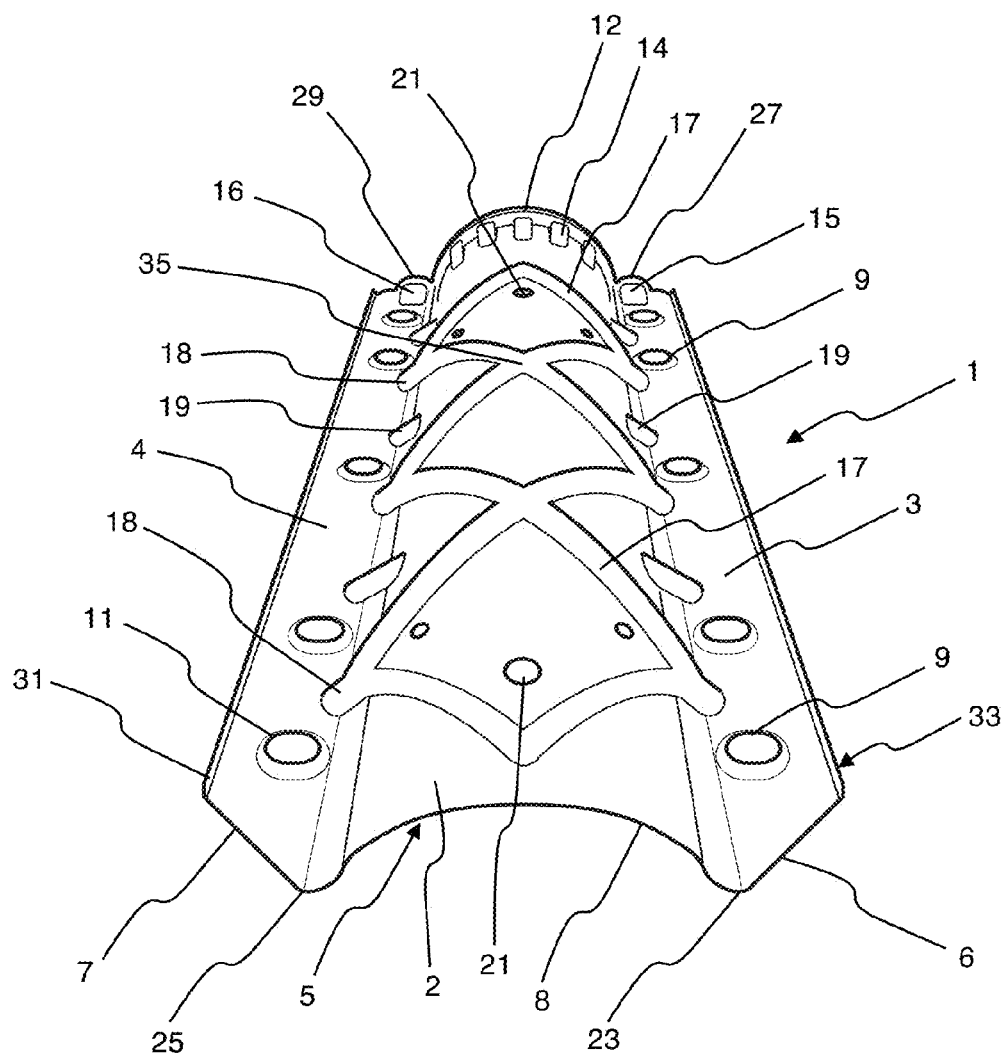
FIG. 1 is a general front on perspective view of a bracket used in the preferred embodiment of the clamp arrangement for this invention.
Figure 2:
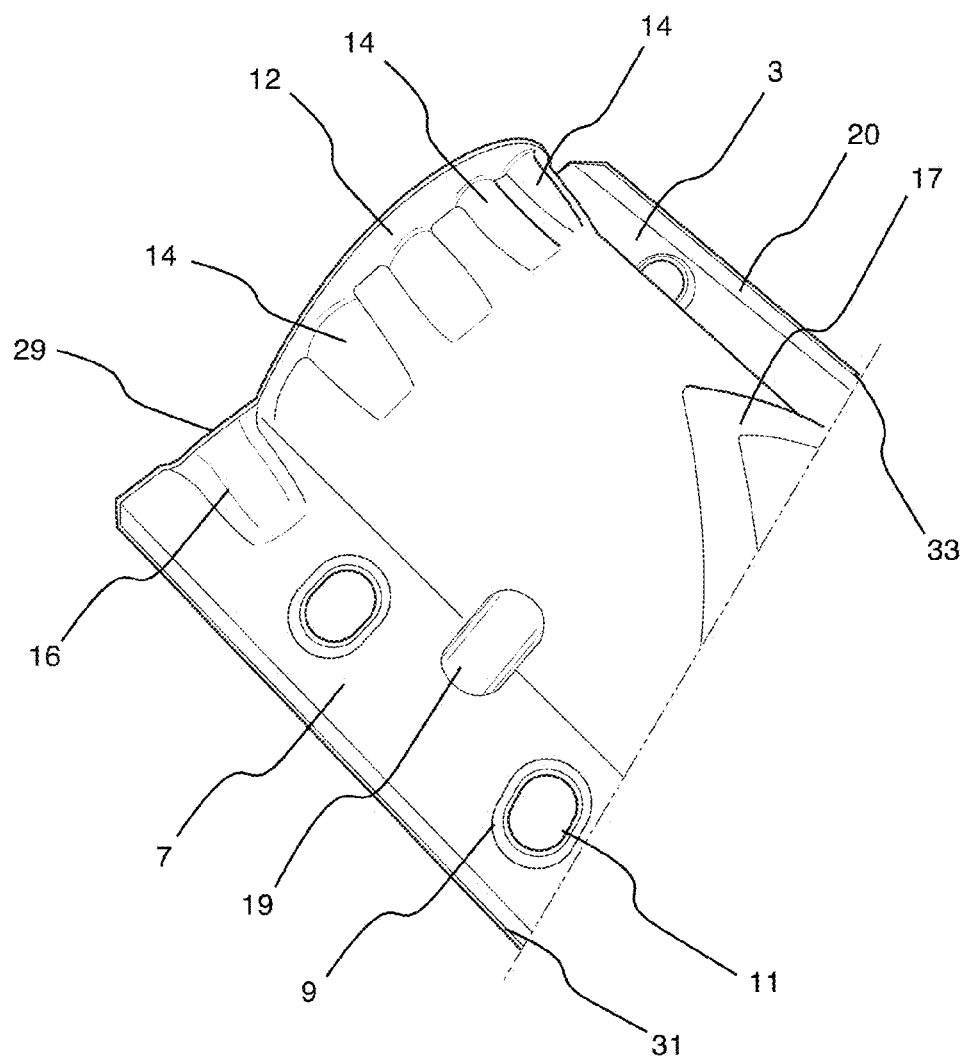
FIG. 2 is a part front top perspective view of the bracket used in the clamp arrangement for a preferred embodiment of the invention.

As can be seen in FIG. 1 a series of pressed protruding slots 17 form a series of diamond shaped embossed configurations on the external side of the bracket 1 where the vertical meeting sides of the corners at 35 interconnect the diamond shapes and wherein the side corners of the joining together protruding diamond shape slots 17 meet at corners 18 in an overlap with the respective folds 23 and 25 where the flanges 3 and 4 extend out from the longitudinal hemispherical chamber 2.

In addition there are also protruding pressed out tabs 19 that run along the length of the folds 23, 25 between the flanges 3 and 4 extending out from the longitudinal hemispherical chamber 2.

A plurality of holes 9 are provided for along the respective flanges 3 and 4 so that when brackets 1 are aligned and brought together about the post to be repaired these holes 9 can line up so that fastening bolts, rivets and so forth can pass there through so that the respective brackets 1 can be bolted about the wooden posts as required.

Each hole 9 in the preferred embodiment has a raised rim or collar 11 which as part of an integral sheet of metal results that when a head of a bolt rests around the rim 9 and tightening, say for example by way of a turning of a nut along the threaded length of the bolt, the head of a bolt is able to collapse to a certain degree the rim or collar 9 about bolt so as to more rigidly hold and secure respective brackets that have been brought together.

Each longitudinal flange 3 and 4 also includes on its peripheral edge a raised shoulder 31 and 33. Once again these raised shouldered edges 31 and 33 increase the structural integrity of the bracket 1 when in the clamping position and also during the requirement when impact needs to be placed upon the bracket to drive into the ground.

The longitudinal hemispherical chamber 2 also includes additional holes 21 to which nails and so forth can be hammered into if required in order to provide further fastening and fixing of the bracket when clamped about opposed to be repaired.

Figure 4:
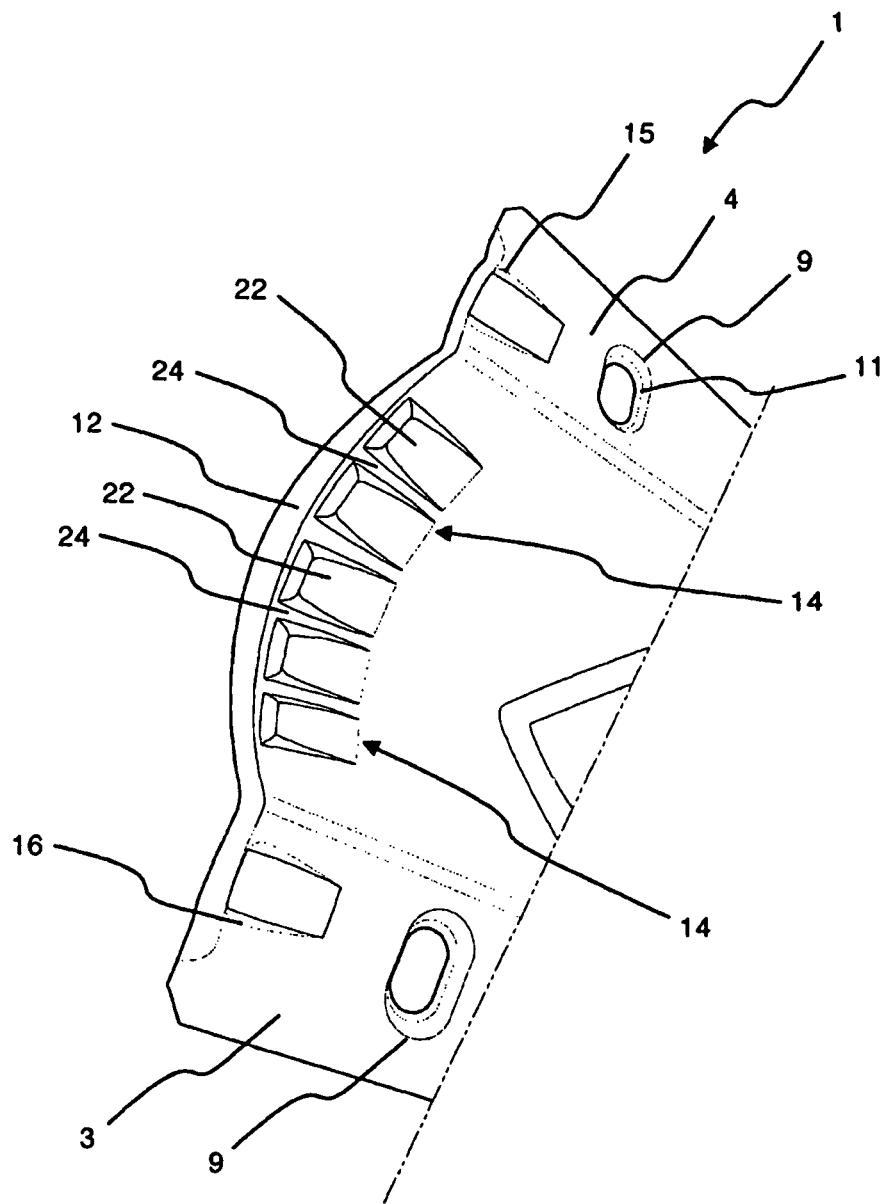
FIG. 4 is a perspective view showing the reverse side of the bracket shown in FIG. 2.

As best seen in FIG. 4 looking at the bracket from the inside looking out the pressed ribs 14 provide for a series of flattened or rounded peaks 22 separated by a series of ridges or troughs 24.

These levelled or flattened peaks 22 following the curvature line of the lateral lip 12 provide a comfortable fit of the bracket 1 when placed up against a wooden post for clamping.

The ridges or troughs 24 provide an open channel to which air and so forth can pass there through.

As discussed precedingly in the general description for the invention this feature allows a certain degree of interaction of the wood which is encompassed by the bracket 1 to be exposed to environmental conditions to which the part of the wooden post that is not clamped is presented with.

Accordingly there will be consistency in the condition of the wood along the length of the post and therefore no internal stresses which may lead to cracking and fracturing are likely to take place.

FIG. 5 illustrates the driving or ramming of the brackets 1 that have been clamped together into the ground 32 using an impact tool such as a motorised hammer or jack hammer 30.

Under normal conditions a single integral sheet of metal would first of all not provide any location to which such an impact tool could locate in order to drive the clamp into the ground and more importantly even if it could the stress of the impact would most likely see a buckling or collapsing of the bracket where it would lose its tight fit encapsulation about the wooden post.

In this invention the bracket by virtue of the lateral lip 12 supported by the multiplicity of pressed out ribs 14 provides a structural platform with the required leverage point for the impact tool 30 to engage, but also not only a location for engagement but also the necessary support to absorb the necessary impact without losing the structural integrity of the bracket 1.

In the past these kinds of brackets would have been simply of a consistent length of the lip that has been provided for.

These types of brackets because of their thickness means that it is for the most part not possible to press and cut out a single bracket that would need to be forged or cast and in certain instances have the various sections of the bracket welded or fastened together.

The introduction of the pressed rib 14 to support the lateral lip 12 has created an inherent support means in that this bracket 1 no longer needs to be of significant thickness as the lateral lip 12 as introduced above provides that location for contact with the impact tool, and with the pressed ribs 14 as there is a support means that the lip 12 doesn't collapse over and/or resulting in a buckling or folding out of the bracket.

For the most part the brackets 1 would come together about the wooden post 28 to be repaired. Bolts 26 would pass through holes 9 and then be clamped with a corresponding nut and once secured the impact tool 30 which in this shown embodiment in FIG. 5 is a ramming shank connected to a jack hammer arrangement 30 which is able to rest upon the respective lateral extending lips where the bracket is then driveable into the ground 32.

The invention claimed is:

1. A clamp arrangement for supporting a fractured portion of a wooden post wherein at least part of the clamp arrangement needs to be driven into the ground about the wooden post, said arrangement including:
   a pair of brackets adapted to be clamped on opposing sides of the wooden post to encapsulate said fractured portion;
   each bracket made from an integral sheet of metal cut and pressed to define a longitudinal hemispherical chamber of compatible diameter dimensions to the wooden post, the longitudinal hemispherical chamber having an external surface and including a configuration of pressed out interconnected diamond shaped protrusions that emboss out over the external surface;
   a pair of longitudinal flanges extended out from each side at a circumferential edge at an open end of the longitudinal hemispherical chamber, wherein each flange includes a plurality of holes so that when each bracket is brought together about the post the plurality of holes on the respective longitudinal flanges line up so that a fastening arrangement can pass through the holes to clamp each bracket together about the post;
   said longitudinal hemispherical chamber having an upper end, said upper end characterized in having a laterally extended lip, wherein the lip is supported by a multitude of pressed out ribs emanating from an internal side at said upper end of the longitudinal hemispherical chamber such that when the clamp arrangement is required to be driven into the ground about the wooden post, the lip provides a support location for an impact tool to drive the clamp arrangement into the ground.

2. The clamp arrangement of claim 1 wherein the pressed out ribs on the internal side at the upper end of the longitudinal hemispherical chamber provide a series of levelled out peaks and intermittent troughs where the levelled out peaks are configured to abut up against the external surface of the post.

3. The clamp arrangement of claim 2 wherein the intermittent troughs between the levelled out peaks of the pressed out ribs provide a passage for air flow down through the bracket when fastened to the post.

4. The clamp arrangement of claim 1 wherein the configuration of pressed out interconnected diamond shaped protrusions that emboss out over the external surface of the longitudinal hemispherical chamber have joined edges that are pressed out along the edge where the longitudinal flanges extend out from each side of the circumferential edge at the open end of the longitudinal hemispherical chamber.

5. The clamp arrangement of claim 1 wherein a multiplicity of pressed tabs are embossed out along a contact fold where the longitudinal flanges extend out from each side of the circumferential edge at the open end of the longitudinal hemispherical chamber.

6. The clamp arrangement of claim 1 wherein the holes along each of the longitudinal flanges include a raised rim or collar.

7. The clamp arrangement of claim 1 wherein the longitudinal hemispherical chamber includes additional holes on its surface wherein nails and so forth can be passed there through to provide additional fixation of the bracket to the wooden post.

8. The clamp arrangement of claim 1 wherein the impact tool is a hammer and/or a motor driveable ramming device including a jack hammer.

9. The clamp arrangement of claim 1 wherein the bracket further includes an aperture to which wire and/or trellis connected to adjacent posts can be wrapped around or supported there from.

10. The clamp arrangement of claim 1 wherein the longitudinal flange extending out from each side of the circumferential edge at the open edge of the longitudinal hemispherical chamber is tapered at a ground engaging end.

11. The clamp arrangement of claim 1 wherein the integral sheet of metal is a single sheet of thickness between 1 mm to 3.2 mm.

* * * * *